United States Patent [19]

Joyce, Jr.

[11] Patent Number: 4,552,238
[45] Date of Patent: Nov. 12, 1985

[54] TRACTOR SCRAPER HITCH STEERING AND SUSPENSION SYSTEM

[75] Inventor: Hardin Joyce, Jr., Springfield, Ill.

[73] Assignee: Fiatallis North America, Inc., Carol Stream, Ill.

[21] Appl. No.: 535,793

[22] Filed: Sep. 26, 1983

[51] Int. Cl.[4] .......................... B62D 5/10; B60G 25/00
[52] U.S. Cl. .................................. 180/139; 37/126 R; 172/783; 172/799; 280/6 H; 280/492; 280/754
[58] Field of Search .................. 180/139, 132, 134; 280/492, 6 H, 704, 754, DIG. 1; 172/799, 793, 789, 781; 37/124, 126 R, 126 A, 126 AA, 126 AB, 126 AC, 126 AD, 126 AE, 129, 8

[56] References Cited

U.S. PATENT DOCUMENTS

| | | | |
|---|---|---|---|
| 3,032,135 | 5/1962 | McAdams | 180/139 |
| 3,314,496 | 4/1967 | Thassy | 180/139 |
| 3,672,460 | 6/1972 | Takata | 172/789 X |
| 3,953,040 | 4/1976 | Unruh et al. | 280/6 H |
| 4,279,312 | 7/1981 | Pyle | 172/793 X |
| 4,279,319 | 7/1981 | Joyce, Jr. | 180/12 |

Primary Examiner—Joseph F. Peters, Jr.
Assistant Examiner—Charles R. Watts
Attorney, Agent, or Firm—Robert A. Brown

[57] ABSTRACT

A tractor scraper hitch steering and suspension system wherein a tractor drive wheel axle frame is pivotally connected to a tractor main frame to permit vertical movement of the tractor drive wheels relative to the tractor. Two hydraulic cylinders are pivotally connected between the tractor drive wheel axle frame and a cross arm forming a part of a hitch assembly that secures the tractor to the scraper. The hydraulic cylinders dampen vertical bounce movement that occurs during operation and control tilting or rolling motion between the tractor portion and the scraper portion that occur about their common longitudinally extending axis. A locking brake is provided to resist vertical motion of the tractor drive wheel axle frame to stabilize the depth of a cutting edge of the scraper during operation and obtain a steady depth of cut. A pressurized hydraulic system including an accumulator, a source of fluid pressure, fluid control valves, restrictor orifices and a sensor system are effective to maintain a range of predetermined vertical positions of portions of the articulately connected vehicle regardless of the weight of the load being received, carried by, or discharged from the scraper bowl to thereby control riding characteristics when encountering bounce, pitch or rolling conditions.

15 Claims, 10 Drawing Figures

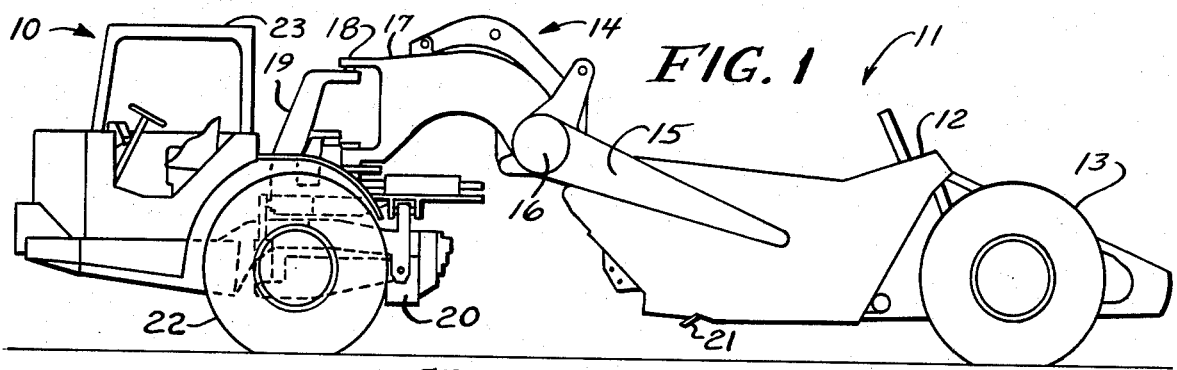
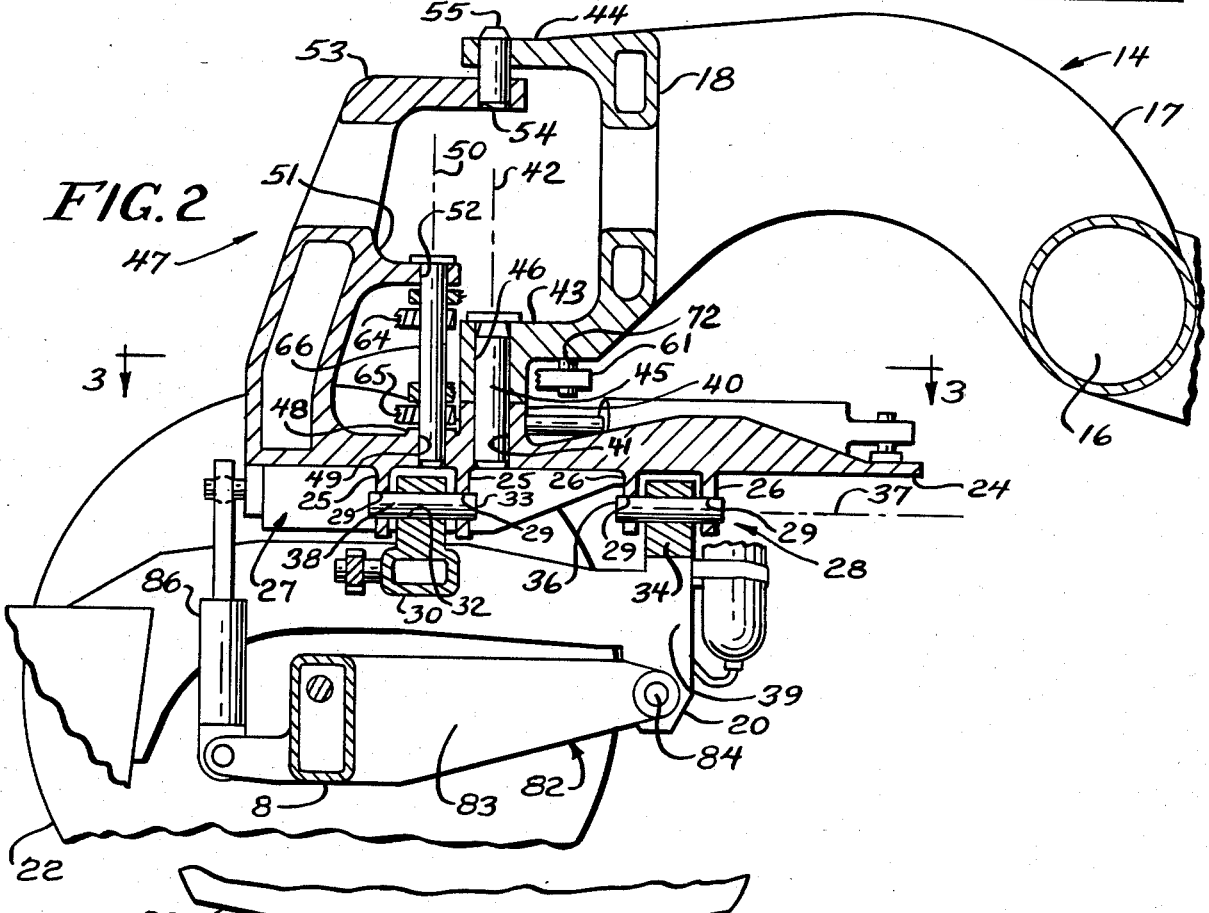
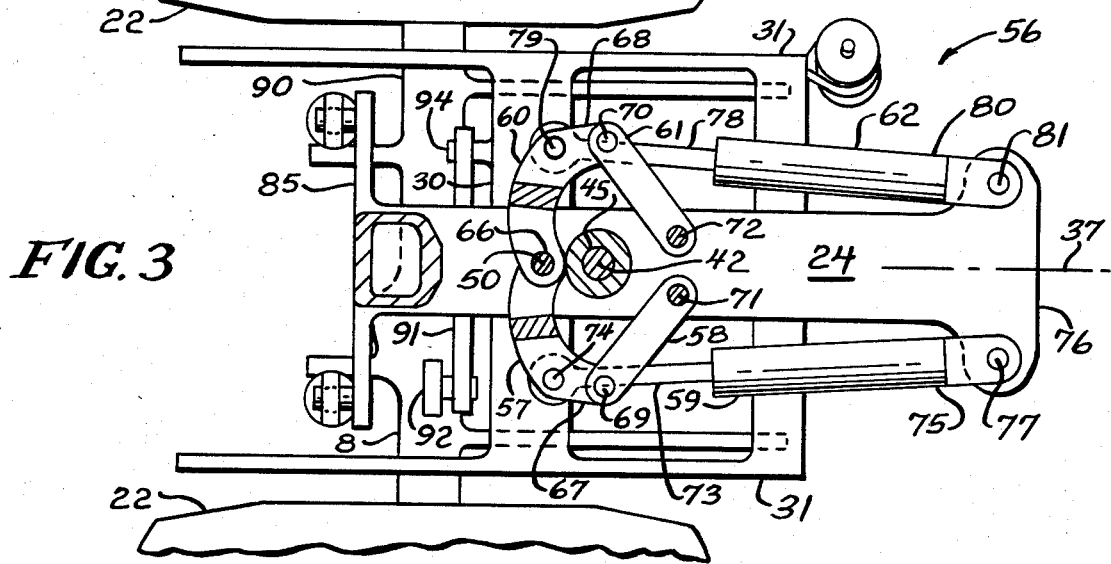

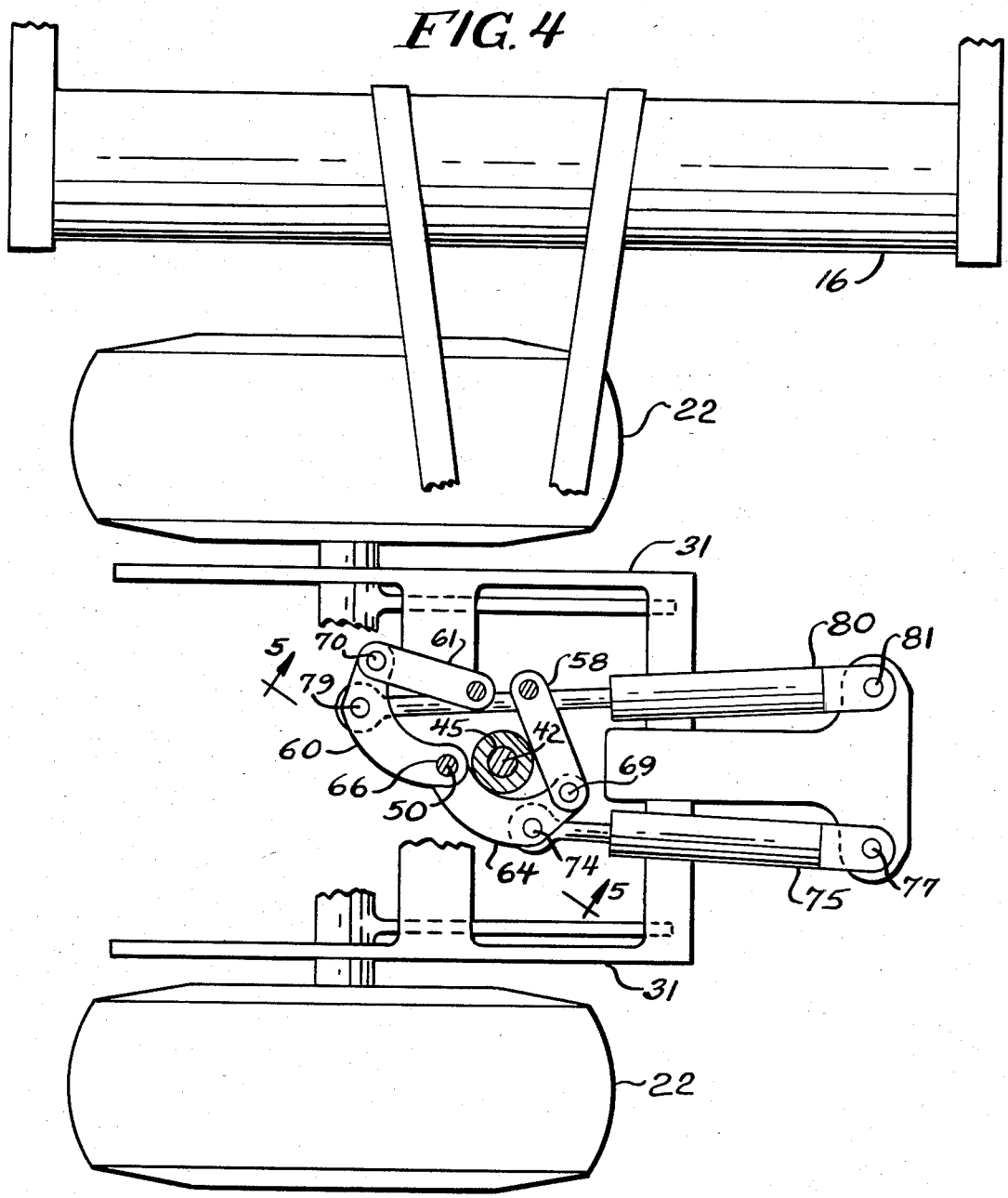
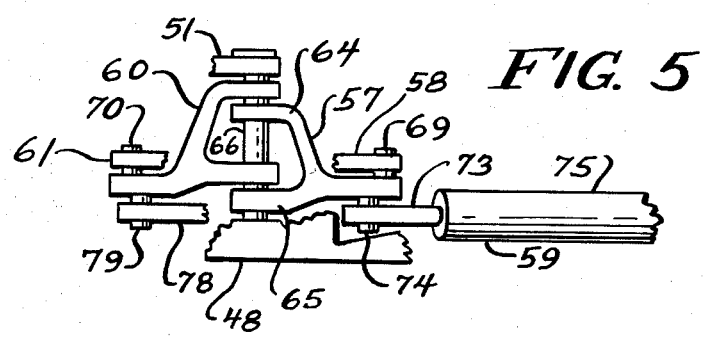

TRACTOR SCRAPER HITCH STEERING AND SUSPENSION SYSTEM

BACKGROUND OF THE INVENTION

This invention relates in general to vehicle steering and suspension systems and, in particular, to a hitch steering suspension system and control circuit especially useful for a four-wheel, two-axle articulately connected tractor-scraper combination.

More specifically, but without restriction to the particular use which is shown and described, this invention relates to a hitch steering, vehicle suspension system for use with a four-wheel, two-axle earthmoving tractor-scraper for steering and controlling bouncing, pitching and rolling motions encountered during operation. In addition, this invention relates to a control system for the vehicle suspension system used on an articulated earthmoving scraper to minimize the bouncing, pitching and rolling motions that occur during operation of a vehicle.

Articulated wheel or tractor scrapers are used for many applications in the construction industry wherein it is necessary to transport heavy loads of material such as dirt and rock over terrain from one location to another, such as in levelling or filling construction or highway sites. Such wheel or tractor scrapers comprise two or four-wheel tractor portions and a two-wheel trailer portion which are articulated about a combined draft and steering coupling, or hitch, formed between the tractor and trailer. The two units are interconnected by a draft frame attached to the trailer which is pivotally mounted on an A-frame, gooseneck coupling of the tractor. The tractor scraper is steered through the manipulation of hydraulic jacks connected between the two portions of the vehicle by turning the tractor portion with respect to the trailer portion about a vertically disposed articulation pivot axis formed by the interconnection between the front and rear portions of the vehicle.

In operating articulated vehicles such as tractor scrapers, it is frequently necessary to allow the tractor and trailer portions of the vehicle to tilt relative to each other about a longitudinal axis extending through the vehicle. Such tilting or rolling is necessary to keep all of the vehicle wheels in contact with the operational surface when travelling over uneven terrain to prevent the loss of tractive power. However, the amount of tilting or rolling movement between the tractor and trailer portions of the vehicle must be controlled in order to maintain vehicle stability. While a limited amount of rolling or tilting of the two portions of the vehicle relative to each other is desirable within predetermined limits, such roll or tilt must be controlled.

In addition to roll or tilt between the tractor portion and the trailer portion of the tractor scraper, bouncing or pitching movement is frequently encountered. Such movement is believed to result from the resiliency of the tires and the weight of the scraper trailer which is suspended between the front and rear wheels of the combination and frequently occurs during hauls at relatively high vehicle speeds. Due to the large size and weight of the tractor scraper, and of the loads transported by it, ordinary shock absorbers or vibration isolators are impractical to resolve the problems created by such bouncing or pitching movement. Such bouncing or pitching movement is uncomfortable and potentially dangerous to the machine operator and, due to the large shock loads imparted by the bouncing trailer portion, can result in damage or failure of structural parts of the vehicle, particularly those closely associated with the load carrying body.

A number of attempts have been made to resolve or control the rolling, bouncing and pitching conditions encountered in tractor-trailer combinations. One such control system has been illustrated in the inventor's U.S. Pat. No. 4,279,319, the disclosure of which is incorporated herein by reference. For example, in U.S. Pat. No. 4,279,319 there is utilized an arrangement for controlling a vehicle axle suspension system wherein a plurality of pitch damping and roll or tilt damping hydraulic cylinders are operatively connected to portions of the vehicle for dampening undesirable movement.

Another control system is illustrated in the inventor's U.S. Pat. No. 4,201,273, the disclosure of which is also incorporated herein by reference. In U.S. Pat. No. 4,201,273, there is utilized a first pair of hydraulic cylinders to control and dampen vertical bounce movement and a second pair of hydraulic cylinders for supplementing the first pair of cylinders to control vertical movement between the tractor drive wheels and to dampen tilting and rolling motion between tractor and trailer about their common longitudinally extending axis.

Other attempts have been made to resolve the bouncing and pitching problems associated with tractor-trailer units. For example, attempts have been made to utilize a separate tractor drive wheel axle A-frame pivotally connected to the tractor main frame to allow for vertical movement of the tractor drive wheels relative to the frame. In U.S. Pat. No. 3,865,205, there is disclosed such a separate drive wheel axle frame which is pivotally connected to the front portion of the tractor main frame to extend rearwardly to a position beneath the hitch assembly. It is the object of such a coupling arrangement to obtain better weight distribution by permitting the vehicle engine to be mounted on the rear portion of the tractor unit and to allow the vehicle operator to be positioned forwardly of the engine for increased visibility.

Other examples of steering and suspension systems are described in U.S. Pat. Nos. 2,638,998, 3,032,135 and 3,828,882. These references show various arrangements of swing arms pivotally connected to intermediate members for movement about a vertical articulation pivot point and including steering cylinders to move the swing arms and intermediate members for steering the vehicle.

While each of these patents discloses apparatus that attempt to resolve the problems associated with steering tractor trailer units and the controlling bouncing and pitching movement thereof have been somewhat successful, such disclosures do not provide for completely controlling the rolling or tilting conditions between the tractor and trailer portions of the articulated vehicle.

SUMMARY OF THE INVENTION

It is, therefore, an objective of this invention to improve steering and suspension systems of vehicles.

Another object of this invention is to improve steering and suspension systems for off-highway articulated earthmoving equipment.

A further object of this invention is to dampen or control the bouncing, pitching and rolling movement encountered during operation of articulated vehicles.

These and other objects are attained in accordance with the present invention wherein there is provided a tractor scraper suspension system having a tractor drive wheel axle frame pivotally connected to a tractor main frame to permit vertical movement of the tractor drive wheels relative to the tractor.

DESCRIPTION OF THE DRAWINGS

Further objects of the invention together with additional features contributing thereto and advantages accuring therefrom, will be apparent from the following description of a preferred embodiment of the invention which is shown in the accompanying drawings with like reference numerals indicating corresponding parts throughout, wherein:

FIG. 1 is a side elevational view of an articulated wheel tractor-scraper combination generally identifying components of the vehicle hitch and suspension system;

FIG. 2 is a side elevational sectioned view of a portion of the vehicle hitch system taken along a vertical plane located at the longitudinal centerline of the machine and showing details of the steering linkage between the tractor and scraper.

FIG. 3 is a sectional plan view of a portion of the vehicle hitch system taken along line 3-3 of FIG. 2, below the top portion of the hitch and draft frame superstructure to better show the steering linkage, cylinders, swing arm yokes and links that connect to pins extending from the underside of the gooseneck pedestal.

FIG. 4 is a plan view of a portion of the vehicle suspension system taken along a plane substantially the same as FIG. 3, but showing the cooperative association among the steering cylinders, swing arm yokes and links when the tractor is turned 90 degrees to the right in relationship to the draft frame torque tube connected to the scraper.

FIG. 5 is an elevational view of a portion of the vehicle suspension system taken along line 5-5 of FIG. 4 showing details of the steering linkage in the rotated position of FIG. 4 to better illustrate the manner in which swing arm yokes are secured by under and over stub pin connections to the steering cylinders and the manner in which the links are connected to the pedestal.

DESCRIPTION OF THE PREFERRED EMBODIMENT

Figure 6:
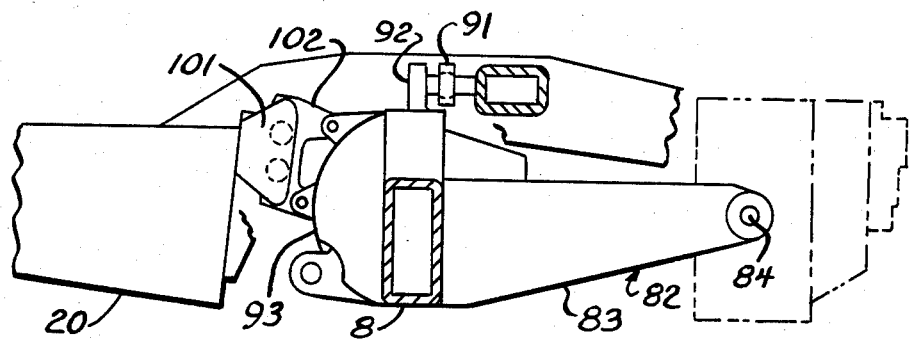
FIG. 6 is a side elevational view taken at an underside of the vehicle showing partly sectioned portions of the tractor axle and frame and illustrating the locking brake arrangement.
Figure 7:
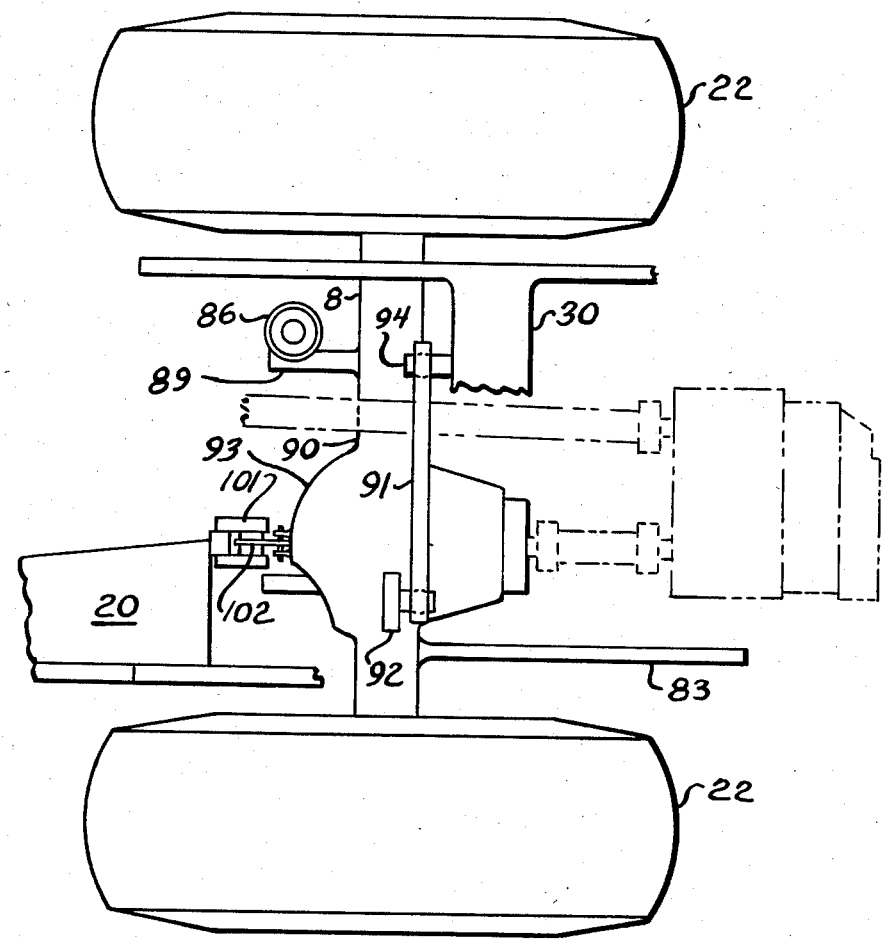
FIG. 7 is a plan view of structure of FIG. 6 showing details of the caliper type brake head secured to the tractor frame for engaging a plate fastened to the axle housing; the stabilizing link connection between axle housing and frame and the manner in which the transmission associates with input and output drive shafts.

Referring now to FIG. 1 there is shown a construction machine or earthmoving vehicle commonly referred to as a wheeled tractor scraper. Although the vehicle hitch and suspension system disclosed herein may be used with various vehicles, for convenience of illustration, the preferred embodiment is illustrated with reference to its use with a fourwheel vehicle comprising a single axle tractor and a two-wheel scraper.

Generally, such a tractor scraper includes a draft or tractor unit 10 and a drawn or trailer portion 11. The trailer portion 11 includes an open scraper bowl 12 supported at its rear end by a pair of wheels 13 and at its front end by the tractor portion through a draft frame 14 having a pair of draft arms 15 pivotally connected to outboard ends of a transverse support beam 16 of the draft frame that extend rearwardly to connect with the vertical sidewalls of the scraper bowl. The draft frame 14 further includes a gooseneck 17 having a forward end or pedestal 18 pivotally connected to a coupling hitch 19 secured to supporting main frame structure 20 of the tractor 10 in a manner hereinafter described.

The scraper bowl includes a cutting edge 21 disposed at its bottom front end which during operation acts to excavate a predetermined amount of earth or other material as the tractor scraper moves along an operation surface. The volume or amount of material removed as the scraper passes along the surface is controlled by raising or lowering the cutting edge 21 carried at the front end of the scraper bowl. Raising or lowering of the cutting edge to a desired position is accomplished by the action of fluid operated motors in a well known manner and not shown herein.

The tractor 10 of the scraper is supported by a pair of drive wheels 22 and includes an operator cab 23 having an instrument and control panel conveniently located within the reach of the machine operator for controlling the vehicle as well as to monitor or adjust various accessory or auxiliary equipment of the tractor scraper for effecting desired operations. As shown in FIG. 1, the trailer 11 is joined mechanically to the tractor portion 10 by means of a pivotal connection between the coupling hitch 19 and the pedestal 18 of gooseneck 17.

Referring to FIGS. 2 and 3, the coupling hitch 19 comprises a generally rectangularly shaped base frame 24 having a forward pair of plates 25 and a rearward pair of plates 26 extending downwardly to form first 27 and second 28 bracket members, the bracket members having formed therethrough apertures 29 with axes that lie along a longitudinal axis coincident with a vertical plane of the centerline of the machine. The first bracket 27 is adapted to span an intermediate portion of a front crossbeam 30 secured between a pair of parallel sides 31 of the main frame 20 of the tractor. The front crossbeam 30 has a bore 32 formed therethrough wherein is journaled a forward hitch pin 33 that extends through the apertures 29 of first bracket 27 in order to effect a pivotal relationship between the tractor 10 and the scraper 11. Similarly, the second bracket 28 is adapted to span an intermediate portion of a rearward crossbeam 34 secured between the pair of parallel sides 31 and main frame 20 of the tractor. The rear crossbeam 34 has a bore 35 formed therethrough wherein is journaled a rearward hitch pin 36 that extends through the apertures 29 of second bracket 28 in order to effect a pivotal relationship between the tractor 10 and the scraper 11.

The pivotal relationship between tractor and scraper permits tilting and rolling relative to each other about a horizontal axis 37 extending longitudinally of the machine center line.

Figure 8:
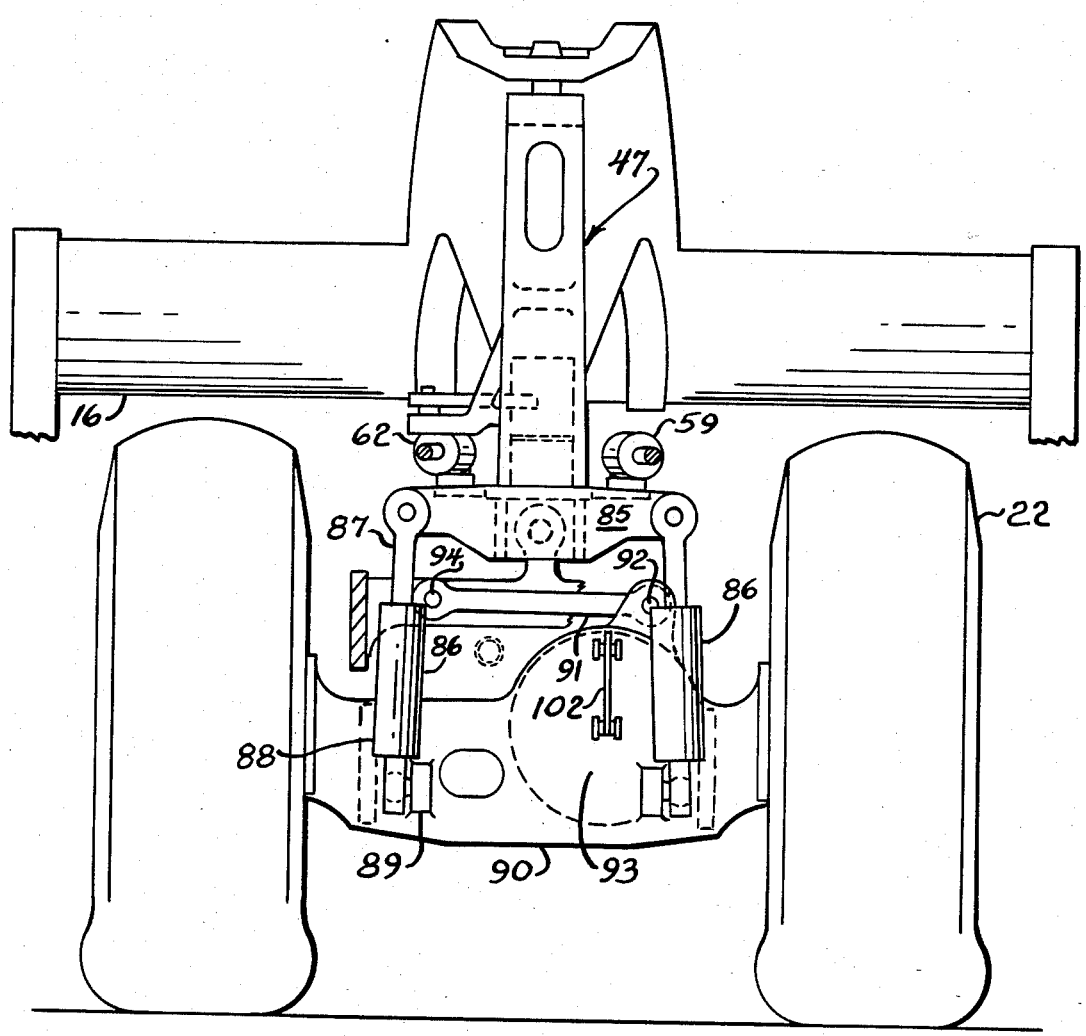
FIG. 8 is an elevational view taken in front of the tractor axle showing the suspension cylinders connected between the axle housing and the hitch frame and portions of the hitch pin connection between the tractor frame and pedestal superstructure.

Continuing to refer to FIGS. 2 and 3 and also referring to FIG. 8, the hitch base frame 24 of coupling hitch 19 extending generally longitudinally of the vehicle is connected to the tractor frame 20 at a forward horizontal pivot point 38 and a rearward horizontal pivot point 39. The hitch frame 24 is free to rotate about the longitudinal pivot axis 37 to permit relative motion between the tractor and scraper that is controlled as desired in a manner as hereinafter described. The hitch frame 24 has formed thereon a boss 40 having formed therethrough an aperture 41, the center of which defines a vertical articulation axis 42 about which the tractor is free to pivot relative to the scraper. The pedestal 18 forming a part of the scraper draft frame 14 has a U-shaped forward portion with a lower bracket 43 and an upper bracket 44 formed with apertures therethrough and aligned coincidentally with the articulation axis 42. A pin 45 is secured in the aperture 41 of boss 40, extends into an aperture 46 of lower bracket 43 of the pedestal 18 and serves to effect a lower pivotal connection between the hitch frame 24 and the pedestal 18.

An "A"-frame superstructure portion 47 of hitch frame 24 extends vertically therefrom and includes a lower boss 48 having an aperture 49, the center of which defines a vertically extending common axis 50. The A-frame 47 has a horizontally disposed extension 51 located substantially intermediate the upper and lower ends of superstructure portion 47. The extension 51 has an aperture 52 formed therethrough having a vertical axis oriented to be coincident with common axis 50. A-frame 47 has an upper, generally horizontal portion 53, an extremity of which has formed therethrough an aperture 54. The axis of aperture 54 is oriented to be coincident with articulation axis 42 and is disposed so that a pin 55 connects the upper portion 53 of the A-frame with the upper bracket 44 of pedestal 18 for relative rotation therebetween.

A steering linkage assembly as best seen in FIGS. 3, 4 and 5, generally identified by reference numeral 56 is mounted on a portion of the base frame 24 and interconnects for articulative control the coupling hitch 19 and the draft frame 14. The linkage assembly comprises a first group of associative members including a first crescent-shaped swing arm 57, a first connecting link 58 and a first steering jack 59; and a second group of associative members including a second crescent-shaped swing arm 60, a second connecting link 61 and a second steering jack 62.

Each swing arm 57, 60 has located at its inner end a bifurcated yoke with upper 64 and lower 65 fingers having formed therethrough apertures disposed about a common axis pin 66 connecting the lower boss 48 with extension 51 of the hitch frame superstructure 47 along common axis 50. Each swing arm 57, 60 extends laterally outwardly from vertical common axis 50 of superstructure 47 and has formed at its outer end a respective curved portion 67, 68. The first 58 and second 61 connecting links have a respective one end pivotally connected to a respective outer curved portion 67, 68 by first 69 and second 70 outer pins and have a respective other end pivotally connected to the lower bracket 43 of pedestal 18 by first 71 and second 72 inner pins. The first and second inner pins are vertically oriented and located on the lower bracket 43 of pedestal 18 at points rearwardly of articulation axis 42 and outboard from longitudinal axis 37.

The first steering jack 69 includes a rod end 73 pivotally connected to a substantially intermediate portion of swing arm 57 as by a pin 74 and a head end 75 pivotally connected to a lateral extension 76 of hitch frame 24 by a pin 77. Similarly, the second steering jack 62 has a rod end 78 pivotally connected to a substantially intermediate portion of swing arm 60 by a pin 79 and a head end 80 pivotally connected to the lateral extension 76 of hitch frame 24 by a pin 81. It can be noted that extension of the steering jack 59 and retraction of steering jack 62 causes swing arms 57 and 60 to rotate about common axis 50, and cause the tractor to rotate about articulation axis 42 and turn the tractor in a counter clockwise direction. Similarly, extension of steering jack 62 and retraction of steering jack 59 causes the tractor to turn in an opposite direction. Referring to FIG. 4, it can be noted that the steering system of the present invention is effective to rotate the tractor ninety degrees in either direction left or right about the scraper or a total of 180 degrees.

Referring to FIGS. 1, 2, 6, 7 and 8, the vehicle suspension system includes a tractor drive wheel axle support, shown generally by the numeral 82, which is pivotally connected to a rear portion of the tractor main frame to allow the tractor drive wheels 22 to move vertically relative to the tractor frame 20. The tractor drive wheel axle support 82 includes a pair of suspension support arms 83, the forward portions of which are secured to a tractor drive wheel axle 8 which carries and is operatively connected to the tractor drive wheels 22 providing rotary driving power thereto. The power train from a vehicle engine through a torque converter, transmission and differential system are well known to those skilled in the art and portions of this power train are shown in phantom in the drawings. The opposite ends of the suspension support arms 83 are connected to the tractor main frame 20 by means of pivot connections 84 which connect the suspension support arms 83 to the tractor main frame 20 to allow the tractor drive wheel axle support 82 to move in a vertical direction relative to the tractor frame 20. In this manner the tractor drive wheels 22 are free to move vertically relative to the tractor main frame 20 about the pivotal connections 84.

It is also desirable to dampen and limit the amount of roll or tilt between the tractor portion 10 and the trailer portion 11 of the scraper. To this end the hitch frame 24 has a cross arm 85 secured thereto intermediate its ends, the arm ends extending laterally outwardly transverse to the pivot axis 37 that extends longitudinally through the hitch frame. At each outer end of the cross arm 85, there is disposed an axle suspension, roll or tilt dampening hydraulic cylinder 86 having its rod end 87 pivotally connected to the distal ends of the cross arm and a head end 88 pivotally connected to a forwardly extending ear 89 secured to a housing 90 of the axle 8. In this manner, as the tractor portion 10 and the trailer portion 11 roll or tilt relative to each other about the longitudinally extending hitch pin axis, the movement will be dampened through the action of the roll or tilt damping cylinders 86. Roll oscillation between tractor and scraper induces or sets up opposite movements therebetween causing fluid to flow in cylinders 86 that results in damping the oscillatory movement. In addition, the suspension cylinders 86 serve to cushion vertical axle movement and thereby perform the dual functions of cushioning vertical movement and dampening roll oscillation.

In order to stabilize lateral motion imposed stresses in the rear portion of the tractor main frame 20, there is provided a stabilizer link 91. The stabilizer link 91 is pivotally connected at one end 92 to a portion of the tractor drive wheel axle support frame 82, for example a differential housing 93. The stabilizer link has its other end 94 pivotally connected to a portion of the forward cross beam 30 that assists in supporting the hitch coupling 19 so that lateral stability is provided for the tractor 10 and the entire suspension system.

Figure 9:
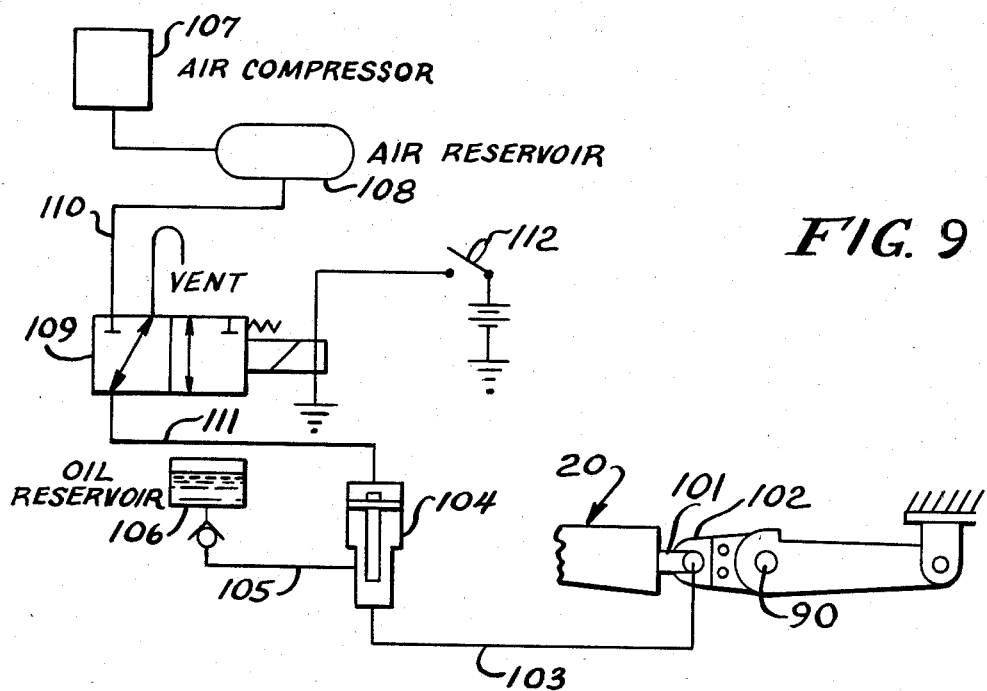
FIG. 9 is a schematic representation of the locking brake arrangement for controlling vertical motion of the tractor axle.

Referring now to FIG. 9, there is shown in cooperation with the hitch steering and suspension system of the present invention, an arrangement to provide braking action to resist vertical motion of axle 8 in order to stabilize the depth of the cutting blade of the scraper bowl during operation of the tractor and trailer vehicle. A disc brake type caliper head identified generally by reference numeral 101 is secured to a part of the tractor main frame 20 and positioned to engage a plate 102 flexibly pinned to the axle housing 90. A conduit 103 supplies pressurized brake fluid to the brake from a pressure converter 104. A conduit 105 provides make up fluid to the pressure converter from an oil reservoir 106. An air compressor 107 and an air reservoir 108 are connected in series to the pressure converter 104 through a solenoid operated or other suitable control valve 109 by means of conduits 110 and 111. Control valve 109 is caused to operate by closing a switch 112. Upon energizing valve 109, the normally open position to atmosphere is changed to connect the system to the air reservoir which causes pressure in the system to actuate the disc brake and hold the axle in a static position at whatever level it is currently disposed. The axle being held in this position is effective to stabilize or maintain the cutting edge of the scraper bowl in a desired position and obtain a steady depth of cut of earth. Thus, the brake will maintain a rigid axle mode or locked position for loading earth or other material, but will also provide for controlled "slippage" to occur within the system to alleviate unusual shock loads in the event the vehicle hits an obstacle that causes a sudden bump or extraordinary vertical motion of the vehicle.

The quality of the cut made by the scraper in the locked position is therefore improved because fluctuations in the position of the cutting edge and bowl with respect to the vehicle supporting surface are eliminated.

Figure 10:
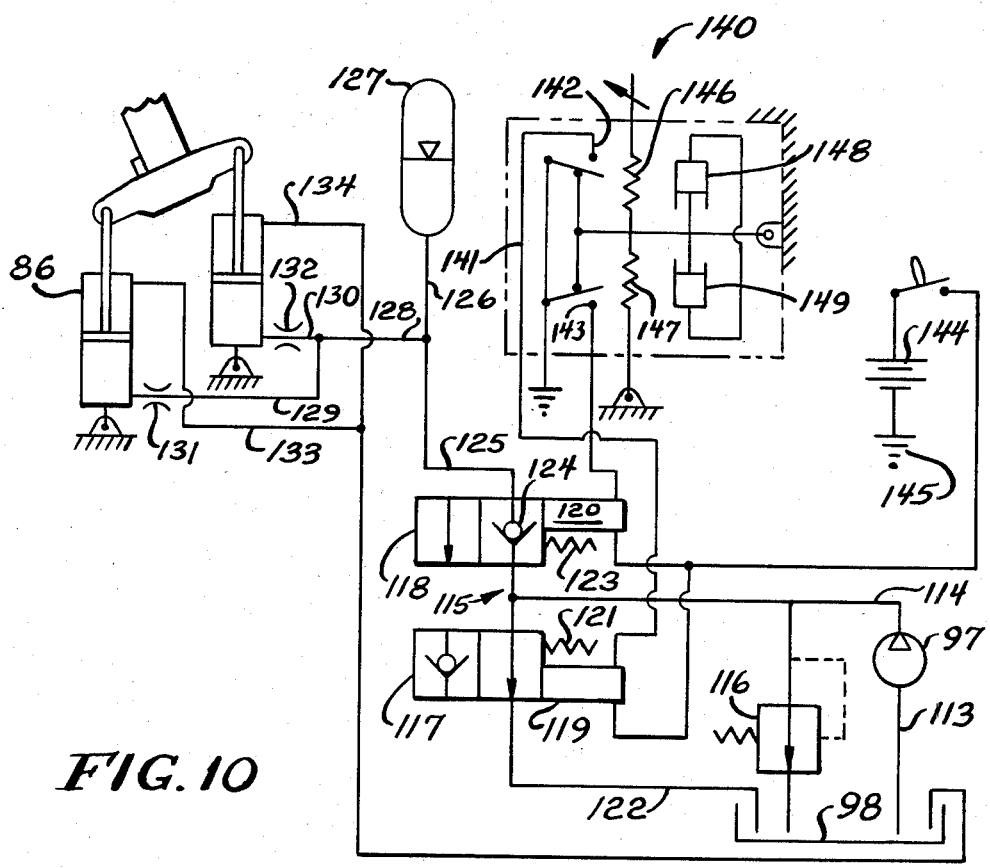
FIG. 10 is a schematic representation of the fluid circuit that controls the various components of the vehicle suspension system.

Referring now to FIG. 10 there is illustrated a fluid schematic diagram of the suspension system and associated control circuit for controlling the bounce damping, tilt or roll damping, and automatic load leveling of the vehicle and the system lockout. A pump 97 delivers hydraulic fluid from a reservoir or sump 98 via an input conduit 113. The fluid is supplied at high pressure via an output conduit 114 to a valve group or system shown generally by the numeral 115. A pressure relief valve 116 is coupled between the output conduit 114 and the sump 112 to protect the hydraulic circuit from excess pressure and to prevent overloading the pump 97. The valve group 115 includes a pair of two-position valves 117, 118 each actuated by a solenoid 119 and 120, respectively. A spring 121 biases the valve 117 to a position in which it is in fluid communication with a return conduit 122 which in turn is in fluid communication with the reservoir or sump 98. Similarly, a spring 123 biases the valve 118 to a position which communicates hydraulic fluid from the conduit 114 and through a check valve 124 via a conduit 125.

Conduit 125 communicates high pressure hydraulic fluid to a conduit 126, which in turn communicates high pressure fluid to a precharged accumulator 127.

The high pressure hydraulic fluid from the pump 97 and the accumulator 127 is communicated to the head ends of the axle suspension cylinders 86 by a conduit 128 via a pair of branch conduits 129, 130. The cylinders 86 assist in supporting the vehicle and the load, and dampen and limit the relative roll motion between the tractor and trailer portions of the scraper. A plurality of line restrictors 131, 132 disposed in the lines 129, 130, respectively, cooperate to control the spring and damping rates in the roll damping portion of the circuit by restricting the flow of hydraulic fluid as it is forced from either one of the respective ends of the cylinders 86 by relative motion between the tractor 10 and trailer 11 portions of the vehicle. The rod ends of cylinders 86 are connected by branch conduits 133 and 134 to a return conduit 135 that is connected to the sump 98.

A sensor, shown generally by the numeral 140, is used for maintaining oil pressure to support the tractor with the drive axle in a mid position or within a predetermined range of positions relative to the tractor regardless of the weight of the load being received, carried, or discharged from the scraper bowl. The sensor 140 includes a sensor switch 141 having a portion affixed to, for example, the tractor frame 20 and a movable portion pivotally connected to the axle portion of the tractor. The switch 141 has a pair of contacts 142 and 143, located at the extremes of the desired range of vertical movement of the drive axle relative to the tractor frame. When the circuit is closed by either of the two extreme positions being attained, due, for example, to a change in the weight of the material in the bowl, an electrical current is established between a battery 144 and ground 145 which selectively energizes one or the other of the solenoids 119 or 120. For example, if the vehicle drops too low with respect to the drive axle 8, the switch 141 completes the circuit when closing into contact 142. The solenoid 119 is activated which overrides the force of the spring 121, and the valve 117 shifts to its second position closing off fluid flow to the reservoir 98. The entire volume of fluid provided by the pump 97 is directed to the head ends of the axle suspension cylinders 86 and accumulator 127 which lifts the vehicle frame, including the bowl and load, until electrical connection through contact 142 is broken. The system then returns to the equilibrium configuration as shown in FIG. 10.

Similarly, if the vehicle is riding too high with respect to the drive axle 8, an electrical circuit is established through contact 143. Solenoid 120 is activated which overrides the force of the spring 123, and the valve 118 shifts to its second position. Hydraulic fluid from the head ends of the cylinders 86 is permitted free return to the reservoir 98, and the vehicle frame and bowl are lowered until contact at point 143 is broken. The system then returns to the equilibrium configuration as shown in FIG. 10. A pair of springs 146 and 147 cooperate with a pair of dashpots 148 and 149, respectively, to filter out minor bounce motion of the drive axle 8 to the sensor 140 thereby insuring smooth operation of the system.

While the operation of the present invention is believed clearly apparent from the foregoing description, its operation is briefly summarized as follows. Referring again to FIG. 10, with the leveling sensor 140 in an intermediate or off position, the pump 97 receives hydraulic fluid from the reservoir 98 via the input circuit 113. The pump communicates the pressurized hydraulic fluid through the output conduit 114 to each of the two position valves 117 and 118 of the valve group 115. In an intermediate or off position the valve 117 returns hydraulic fluid to reservoir 98 via conduit 122. In an operative or on position, valve 117 blocks flow to the reservoir 98, and the valve 118 directs hydraulic fluid to conduit 125, from which it flows through conduit 128 to the head ends of the cylinders 86 wherein pressure is maintained by the action of the accumulator 127.

The conduit 126 communicates high pressure fluid to the accumulator 127 which cooperates with the line restrictors 131 and 132 in providing the spring and viscous damping characteristics of the suspension system. The accumulator 127 and the pump 97 maintain the desired pressure in the head ends of the cylinders 86 required to maintain the vehicle frame 20 within the desired range of preselected positions with respect to the drive axle 8.

Similarly, low pressure from the sump 98 or atmosphere is communicated to the rod ends of the cylinders 86 via the conduit 135 and branch conduits 133 and 134, respectively. The line restrictors 131 and 132 on the head ends of the cylinders 86 provide the viscous damping characteristics to this portion of the circuit during both bounce and roll motions and permit controlled flow of fluid back and forth from one cylinder to the other.

In this manner, the pressure differentials between the head (system pressures) and the rod ends (atmospheric pressure) due to bounce damping assist the cylinders 86 in supporting the vehicle weight and the weight of any load being carried by it. The cushioning required to maintain the desired ride characteristics and operator comfort whenever the vehicle encounters a bump, is provided by the precharged accumulator 127.

While the invention has been described with reference to the preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle steering and suspension system for use with an articulated vehicle having a tractor portion and a trailer portion coupled thereto by a hitch connection that permits the vehicle portions to rotate relative to each other about an articulation axis extending vertically through the tractor and trailer portions comprising;

a hitch base frame secured to a portion of the tractor and having formed therein an aperture coincident with said articulation axis of the hitch connection, structural means forming a part of and extending upwardly from said hitch frame means at a forward portion thereof, said structural means including a bottom portion and a middle portion having formed therethrough apertures oriented to form a vertical common axis located forwardly of said articulation axis, said structural means further including an upper portion having formed therethrough an aperture with an axis coincident with said articulation axis, a draft frame connected to the trailer portion having a forward portion comprising a lower bracket member with an aperture formed therethrough with an axis coincident with said articulation axis, an upper bracket member with an aperture formed therethrough with an axis coincident with said articulation axis, pin means disposed between said bottom portion and said middle portion of said structural means, pin means disposed along said articulation axis connecting said hitch base frame and said lower bracket member of the draft frame for pivotal movement therebetween, pin means disposed along said articulation axis connecting said upper portion of the structural means and said upper bracket member of the draft frame for pivotal movement therebetween, and steering linkage means connected to said hitch base frame disposed to rotate about said common axis and effective to cause said tractor portion to rotate about said trailer portion a total of 180 degrees.

2. The apparatus as claimed in claim 1 wherein the trailer portion includes a scraper bowl having an adjustable transversely disposed cutting edge adaptable for vertical positioning therein comprising:

brake means flexibly connected to said axle support means for at times restraining vertical movement thereof, actuator means coupled to said brake means adaptable to lock said brake means to said axle support means, said actuator means effective to maintain said brake means and said axle support means in locked position so that vertical motion of the axle means is resisted to stabilize the depth of the cutting edge during loading of the scraper bowl.

3. The apparatus of claim 1 including a coupling connection that permits the tractor and trailer portions to tilt relative to each other about a coincident axis extending longitudinally through the tractor and trailer portions comprising, axle support means pivotally connected to the tractor main frame for supporting a pair of tractor drive drive wheels for vertical movement relative thereto, hitch means for connecting the tractor portion to the trailer portion of the vehicle to permit relative tilt movement therebetween about said longitudinal coincident axis, and fluid responsive means coupled between said axle support means and said hitch means to oppose and dampen vertical and tilting movement of said tractor and trailer portions of the vehicle relative to each other.

4. The apparatus of claim 3 wherein said axle support means comprises a pair of suspension support arms pivotally connected to the tractor main frame at one end and supporting said tractor drive wheels at the other end thereof.

5. The apparatus of claim 3 wherein said hitch means includes a transversely extending arm having ends extending outwardly from said longitudinal axis with distal portions of said arm ends connected to said fluid responsive cylinder means.

6. The apparatus of claim 5 wherein said fluid responsive cylinder means comprises a pair of hydraulic cylinders each mutually exclusively pivotally connected at one end of said distal portions of said arm and the other end of each pivotally connected to said axle support means.

7. The apparatus of claim 5 wherein said arm is connected to a hitch base frame extending longitudinally of the vehicle adaptable to rotate about said longitudinal axis, said tractor main frame including a pair of cross beams extending between lateral sides thereof adaptable to be pivotally connected to said hitch base frame, and hitch pin means connecting said hitch base frame and said cross beams of said tractor main frame for pivotal movement therebetween.

8. The apparatus as claimed in claim 3 wherein said hitch means comprises a hitch base frame extending longitudinally of the vehicle adaptable to rotate about said longitudinal axis, a cross arm connected to said hitch base frame having ends extending outwardly from said longitudinal axis with distal portions of said cross arm ends connected to said fluid responsive means, a plurality of cross beams extending between parallel sides of the tractor main frame adaptable to be pivotally connected to said hitch base frame, and said hitch means connecting said hitch base frame and said cross beams for pivotal movement therebetween.

9. The apparatus of claim 1 wherein said linkage means comprises swing arm means having ends pivotally connected to a portion of said hitch base frame for rotation about said common axis disposed forwardly of said articulation axis, connecting link means having first ends pivotally connected to other ends of said swing arms and having second ends pivotally connected to portions of said draft frame, and steering cylinder means having first ends pivotally connected intermediate the ends of said swing arm means and having second ends pivotally connected to portions of said hitch base frame at locations disposed outwardly from a central coincident axis extending longitudinally through the tractor and trailer portions, said steering cylinder means being effective when actuated in one direction to rotate said swing arms about said common axis and thereby cause said tractor to rotate 90 degrees counter clockwise about said articulation axis and when actuated in another direction to cause said tractor to rotate 90 degrees clockwise about said articulation axis.

10. The apparatus of claim 1 wherein said steering linkage means is connected to a first portion of said hitch base frame secured to said tractor portion and to a second portion of said hitch base frame secured to said trailer portion, said linkage means at times being effective when actuated in one direction to rotate said tractor portion 90 degrees counter clockwise about said trailer portion and when actuated in an opposite direction to rotate said tractor portion 90 degrees clockwise about said trailer portion.

11. The apparatus as claimed in claim 3 comprising:
cushioning control mean for controlling spring and viscous damping characteristics of said fluid responsive cylinder means, said cushioning control means interposed in fluid communication between a source of pressurized fluid and a first chamber of each of said fluid responsive cylinder means,
sensing means for detecting the vertical position of the tractor frame relative to a drive axle of the tractor portion and generating a control signal responsive to the relative vertical position of the tractor frame and the drive axle,
levelling means for maintaining the tractor frame within a predetermined vertical distance relative to the drive axle and operatively connected to said sensing means to receive said control signal for actuation in response thereto, and
valve means operable to a plurality of positions interposed in fluid communication between said source of pressurized fluid and said fluid responsive cylinder means,
said valve means operable for mutually exclusively directing pressurized fluid to said first chamber of each of said fluid responsive cylinder means and discharging pressurized fluid from said first chamber of each of said fluid responsive cylinder means thereby modulating the flow of pressurized fluid thereto and therefrom.

12. The apparatus as claimed in claim 11 wherein said cushioning control means includes
accumulator means for containing a portion of pressurized hydraulic fluid and a variable volume of precharged gas, and
fluid flow restricting means interposed in fluid communication between said first chamber of each of said fluid responsive cylinder means and said accumulator means for effecting the spring and viscous damping characteristics of said fluid responsive cylinder means.

13. The apparatus as claimed in claim 3 comprising:
cushioning control means for controlling spring and viscous damping characteristics of said fluid responsive cylinder means, said cushioning control means interposed in fluid communication between a source of pressurized fluid and a first chamber of each of said fluid responsive cylinder means,
sensing means for detecting the vertical position of the tractor frame to a drive axle of the tractor portion and generating a control signal responsive to the relative vertical position of the tractor frame and the drive axle,
levelling means for maintaining the tractor frame within a predetermined vertical distance relative to the drive axle and operatively connected to said sensing means to receive said control signal for actuation in response thereto, and
valve means operable to a plurality of positions interposed in fluid communication between said source of pressurized fluid and said fluid responsive cylinder means,
said valve means operable for mutually exclusively directing pressurized fluid to said first chamber of each of said fluid responsive cylinder means and discharging pressurized fluid from said first chamber of each of said fluid responsive cylinder means thereby modulating the flow of pressurized fluid thereto and therefrom.

14. The apparatus as claimed in claim 13 wherein said cushioning control means includes:
accumulator means for containing a portion of pressurized hydraulic fluid and a variable volume of precharged gas, and
fluid flow restricting means interposed in fluid communication between said first chamber of each of said fluid responsive cylinder means and said accumulator means for effecting the spring and viscous damping characteristics of said fluid responsive cylinder means.

15. Locking brake apparatus for use with an articulated vehicle having a tractor portion carried on a tractor main frame and a trailer portion coupled thereto by a hitch connection that permits the vehicle portions to tilt relative to each other about a longitudinal coincident axis extending through the tractor and trailer portions wherein the trailer portion includes a scraper bowl having an adjustable transversely disposed cutting edge adaptable for vertical positioning therein comprising;

axle support means pivotally connected to the tractor main frame for supporting a pair of tractor drive wheels for vertical movement relative thereto, brake means flexibly connected to said axle support means for at times restraining vertical movement thereof, actuator means coupled to said brake means adaptable to lock said brake means to said axle support means, said actuator means effective to maintain said brake means and said axle support means in locked position so that vertical motion of the axle means is resisted to stabilize the depth of the cutting edge during loading of the scraper bowl.

* * * * *